Nov. 26, 1935.    W. B. NOLD    2,022,430
VALVE AND FLOAT
Filed Nov. 8, 1933
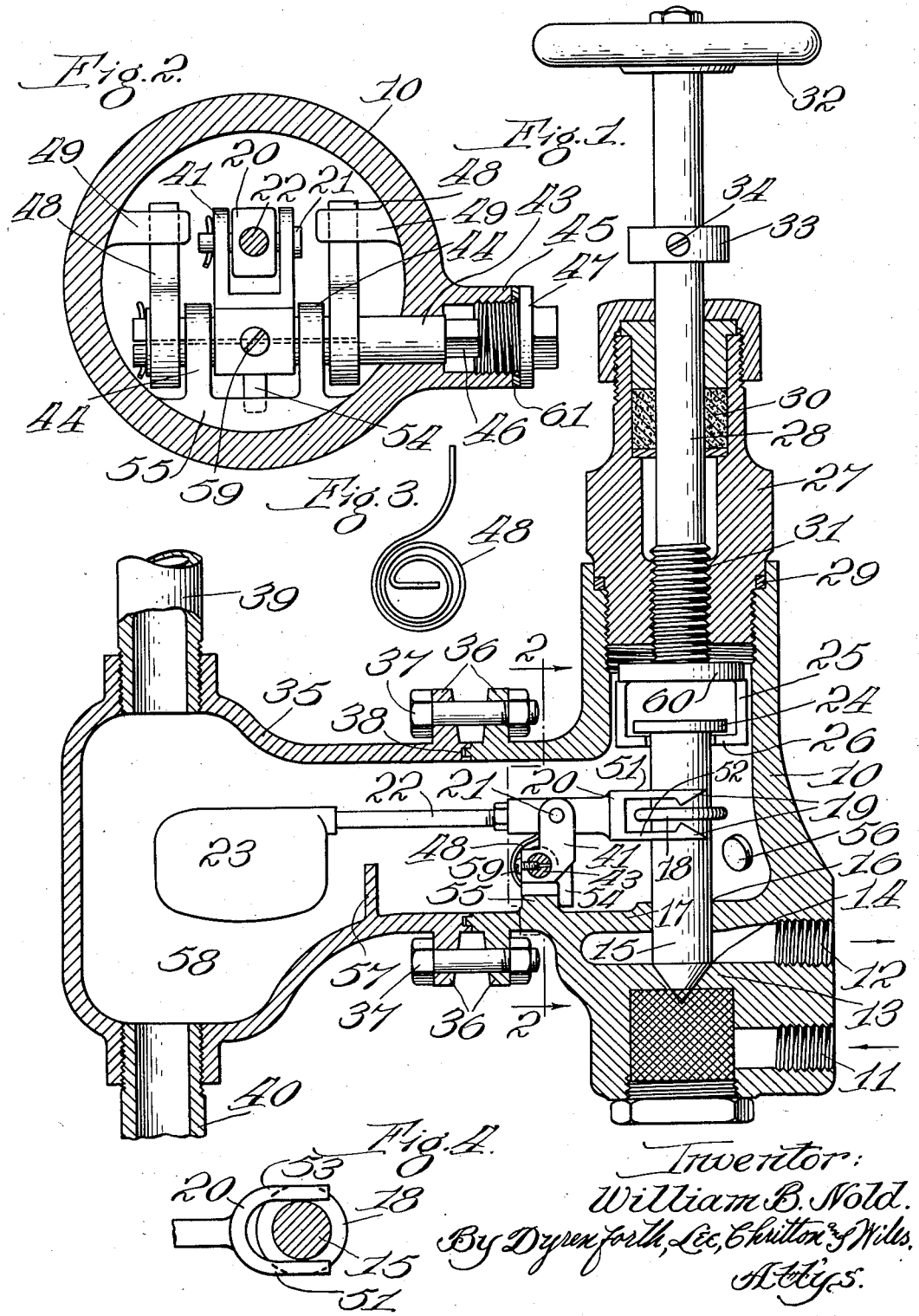
Inventor:
William B. Nold.
By Dyrenforth, Lee, Chritton & Wiles,
Attys.

Patented Nov. 26, 1935

2,022,430

UNITED STATES PATENT OFFICE 2,022,430

VALVE AND FLOAT

William B. Nold, Chicago, Ill.

Application November 8, 1933, Serial No. 697,181

7 Claims. (Cl. 137—104)

My invention relates to float-controlled valves as employed for controlling circulation of a fluid in pressure lines, and especially to such valves as they are used in refrigerating apparatus. My invention has reference more particularly to valve structures with means operable from the exterior of the valve housing whereby improper operation of the valve may be remedied without dismantling the valve housing.

The principal objects of my invention are to provide an improved float-controlled valve for refrigerating systems; to insure freedom of operation of the valve by the float; to enable the float control to be connected to the valve member, or disconnected from it as the occasion may require, by means operable from without the valve casing; and to enable the valve-member to be removed without removal of the float chamber and float mechanism. These and other objects are attained in the construction shown in the accompanying drawing, in which:

Fig. 1 is a vertical sectional view of the valve mechanism, valve housing, and float chamber; Fig. 2 is a vertical sectional view partly in elevation taken along the line 2—2 of Fig. 1; Fig. 3 is a side elevation of a tension spring; and Fig. 4 is a top plan view of the tonged head, valve-member, and annular ring.

Refrigerating systems in general comprise compression equipment, expansion equipment, and a valve connecting the two whereby amounts of liquid refrigerant are permitted to pass from the compression side of the system to the expansion side as needed. It is desirable to employ a float-operated valve for regulating the supply of compressed refrigerant to the expansion side of the system, but difficulty has been experienced heretofore with such valves, as they sometimes stick or fail to seat properly and when this occurs it is necessary to shut down the system and take the valve apart to make the necessary repairs. In those valves which have manual control in addition to a float control the valve-member may be worked up and down without removal from the casing, but it is necessary to remove the float chamber and its connecting pipes and disengage the float control mechanism in order to remove the valve member or to gain access to the seat. My invention obviates these difficulties by enabling the connection whereby the float controls the valve to be disengaged from said valve by manual operation from the exterior of the valve-casing, thus permitting the valve member to be removed by removing the extension housing alone, without removal of the float chamber or disconnection of any pipes thereto, and also permits the valve-member to be worked up and down in its seat and guide without the dismantling of any equipment.

In the particular embodiment of my invention as illustrated, the valve-casing is indicated by the reference numeral 10. The valve-casing has therein an inlet-passage 11 and an outlet-passage 12 separated by a partition 13 which has in it an opening 14 in the form of a truncated cone and a valve-member 15 which seats in the opening 14, said valve-member 15 being slidably guided by an opening 16 in the upper partition 17 of the outlet-passage 12. The valve-member has encircling it at one point an annular ring 18, which is engaged by the points 19 of the prongs 51 and 52 on the tonged head 20. This tonged head is mounted on an arm 22 connected to the float 23, and pivotally supported at 21. The float is free to move in the float-chamber 58 which has pipes 39 and 40 leading from it to an accumulator on the expansion side of the refrigerating system, which accumulator is not illustrated because it forms no part of my present invention.

The float chamber 58 is formed by a float-housing 35 connected to the valve-housing 10 by flanges 36 and bolts 37. The requisite compression is secured by means of a gasket 38. The valve-housing 10 has above it an extension housing 27 which has passing through it a valve-stem 28 in axial alignment with the valve-member. Compression is maintained by means of the gasket 29 and packing 30. The valve-stem has at its upper end a hand-wheel 32 and between said hand-wheel and the extension-housing is a slidable collar 33 adapted to be locked in position by a set screw 34. The valve-stem 28 has part way up its length threads 31 engaging the extension-housing 27. A cross-head 60 is fastened to the lower end of the stem and has projecting downwardly from the head arms 25 having inwardly turned flanges 26 adapted to loosely engage the valve-member 15 below an annular ring 24 at the top of said valve-member. There is sufficient space between the flanges 26 and the cross-head 60 to permit movement of the valve-member 15 when it is being actuated by the float.

The afore-mentioned axis 21 is supported by a fulcrum 41 shiftably mounted, as on a transverse shaft 43 which is journaled in bearings 44 and extends through the wall of the valve-housing 10 into an opening formed by an auxiliary housing 45. The projecting end of the shaft 43 has a squared head 46 adapted to be manually turned by any convenient tool. The auxiliary housing 45 has a cap 47 bearing on a compression-gasket 61 and closing it when it is not desired to operate the shaft 43. The shaft 43 has coil tension springs 48 mounted thereon, said coil springs engaging projections 49 on the walls of the valve-housing 10 in such a manner as to force the fulcrum in the direction of the valve-member and thus engage the tonged head 20 with the annular ring 18. The fulcrum 41 is rigidly fastened to the shaft 43 by a lock-screw 59 and has a stop 54 so positioned that it will rest against the projection 55 and prevent the coil springs from forcing the fulcrum far enough around to cause the tonged head 20 to bind against the valve-member 15.

The float-chamber housing 35 has in it a supporting arm 57 arranged to provide support for the arm 22 when the float-mechanism is disengaged from the valve-member. This support 57 is sufficiently below the arm 22 in its engaged position to enable the float 23 to properly control the valve-member 15. There is in the wall of the valve-housing 10 a sight-opening closed by a plug 56, said sight-opening being so positioned as to afford a view of the valve-member and the tonged head.

The operation of my device is as follows: Liquid refrigerant flows in through the pipe 40 from the accumulator and, since the pipe 39 affords a means for equalizing of the pressure in the float-chamber 58 and the accumulator, the level of the liquid in the float-chamber is the same as that in the accumulator when said accumulator is positioned in the same horizontal plane as the valve. The float 23 follows the level of the liquid refrigerant and by means of the connecting arm 22 and the tonged head 20 operates the valve-member 15. If the level of the liquid in the float chamber drops the valve 15 rises from its seat and permits liquid refrigerant from the compression side of the system to flow from the inlet passage 11 into the outlet passage 12 and thence to the accumulator by proper pipe connections. If the valve member 15 should stick or refuse to seat properly it may be worked up and down by operation of the hand wheel 32, in order to forcibly clear any obstructions. Should it become necessary to remove the valve member for replacement, or in order to grind the seat, it is only necessary to remove plug 47 and turn shaft 43 by means of its squared end 46 to disengage the float control mechanism from the valve member. The extension housing 27 may then be removed, bringing with it the valve member and allowing access to the seat. When the extension housing has been replaced the valve member may be adjusted to its operative position by rotating the hand wheel till the collar 33 is observed to be in the proper position, whereupon the shaft 43 is released and the springs return it to its normal position, the bevelled ends of the tongs ensuring that they will slide into operative engagement with the annular ring on the valve. Replacement of the plug 47 then places the valve in operative condition.

The foregoing detailed description has been given for clearness of understanding only, and no unnecessary limitations should be understood therefrom, but the appended claims should be construed as broadly as permissible, in view of the prior art.

What I claim as new and desire to secure by Letters Patent is:

1. A valve structure of the type described having in combination: a valve member; a float horizontally spaced from said valve member; an arm connected to said float; a tonged head on said arm adapted to engage said valve member; a rockable fulcrum pivotally connected to said arm; a transverse shaft carrying said fulcrum, said shaft projecting through the valve casing; a squared projecting end on said shafts adapted to be engaged by a tool for manual rotation; a removable cap adapted to cover said shaft end; a spring tension device adapted to force said rockable fulcrum in the direction of said valve member; and a stop for said fulcrum so positioned that said tonged head is prevented from binding against said valve member when said fulcrum is in its normal operative position.

2. A valve structure of the type described having in combination; a valve member adapted for vertical motion; a seat for said valve member; a float horizontally spaced from said valve member; an arm connected to said float; an annular ring on said valve member; a tonged head on said arm adapted to loosely engage said annular ring; a movable fulcrum pivotally connected to said arm; a transverse shaft carrying said fulcrum, said shaft projecting through the wall of the valve casing; bearings for said shaft; a squared exterior end on said shaft adapted to be engaged by a tool for manual rotation; a removable cap adapted to cover said shaft end; springs concentrically mounted on said shaft exerting a torque on said movable fulcrum tending to move said tonged head into contact with said annular ring; and a stop for said fulcrum so positioned as to prevent movement of the fulcrum to an extent which would bind said tonged head against said annular ring.

3. Apparatus as described in claim 2 having in combination: a vertical support adapted to engage said arm when said fulcrum has been rotated to the inoperative position.

4. Apparatus as described in claim 2 having in combination: a sight hole in said valve casing permitting a view of said tonged head; and a plug adapted to close said sight hole.

5. A valve structure of the type described having in combination: a valve member; a float; a fulcrumed arm connected at one end to said float; tongs projected from said arm at its opposite end; an annular ring on said valve member adapted to be engaged by said tongs; means for shifting said fulcrum toward or away from said valve member, whereby said arm may be disengaged from said valve member without dismantling the valve casing; and bevelled ends on said tongs whereby re-engagement of said arm with said valve member is facilitated.

6. A valve structure of the type described having in combination; a float horizontally spaced from said valve member; an arm connected to said float; a head on said arm adapted to engage said valve member; a rockable fulcrum pivotally connected to said arm; a transverse shaft carrying said fulcrum, said shaft projecting through the valve casing; means on the projecting end of said shaft whereby said shaft may be manually rotated to engage or disengage said head from said valve member; and means for maintaining said arm, when said head is disengaged from said valve member, in substantial alinement with the operative position thereof.

7. A valve structure of the type described having in combination; a valve member; a float horizontally spaced from said valve member; an arm connected to said float; a tonged head on said arm adapted to engage said valve member; a rockable fulcrum pivotally connected to said arm; a transverse shaft carrying said fulcrum, said shaft projecting through the valve casing; and a projecting end on said shaft adapted to be engaged by a tool for manual rotation, whereby said head may be engaged with said valve member or disengaged therefrom.

WILLIAM B. NOLD.